United States Patent

[11] 3,627,811

[72] Inventors Ingeborg Hammann
 Cologne, Germany;
 Peter Hoffmann, Hollywood, Calif.; Helmut Kleimann, Leverkusen; Dieter Marquarding, Bonn; Klaus Offermann, Dormagen, all of Germany; Ivar Ugi, Santa Monica, Calif.; Gunter Unterstenhofer, Opladen, Germany
[21] Appl. No. 812,361
[22] Filed Apr. 1, 1969
[45] Patented Dec. 14, 1971
[73] Assignee Farbenfabriken Bayer Aktiengesellschaft
 Leverkusen, Germany
[32] Priority Apr. 4, 1968
[33] Germany
[31] P 17 68 130.0

[54] ISOCYANO-DIPHENYL ETHERS AND THIOETHERS
 10 Claims, No Drawings

[52] U.S. Cl. .................................................. 260/465 F,
 260/465 B, 260/465 G, 260/465 A, 124/304

[51] Int. Cl. .......................................................... A01n 9/20,
 C07c 121/60
[50] Field of Search .......................................... 260/465 A,
 465 F, 465.6

[56] References Cited
UNITED STATES PATENTS
3,422,190 1/1969 Ugi et al. ..................... 260/465 X
FOREIGN PATENTS
1,209,798 1/1966 Germany .....................

Primary Examiner—Charles B. Parker
Assistant Examiner—Dolph H. Torrence
Attorney—Burgess, Dinklage & Sprung ABSTRACT: Isocyano-diphenyl ethers and thioethers, i.e. isocyano-(optionally mono- and di- chloro, alkyl and alkoxy)-4'-alkyl-diphenyl ethers and thioethers, or 1-(4'-alkyl- -phenoxy and -phenylmercapto)-(optionally 2,3,4,5 and/or 6-mono- and di- chloro, alkyl and alkoxy)-phenyl-isocyanides, which possess pesticidal, especially acaricidal, properties.

ISOCYANO-DIPHENYL ETHERS AND THIOETHERS

The present invention relates to and has for its objects the provision for particular new isocyano-diphenyl ethers and thioethers, i.e. isocyano-(optionally mono- and di- chloro, alkyl and alkoxy)-4'-alkyl-diphenyl ethers and thioethers, or 1-(4'-alkyl- -phenoxy and -phenylmercapto)- (optionally 2,3,4,5 and/or 6- mono- and di- chloro, alkyl and alkoxy)-phenyl-isocyanides, which possess pesticidal, especially acaricidal, properties, active compositions in the form of mixtures of such compounds with solid and liquid dispersible carrier vehicles, and methods for producing such compounds and for using such compounds in a new way especially for combating pests, especially acarids, with other and further objects becoming apparent from a study of the within specification and accompanying examples.

It is already known that certain aromatic isonitriles exhibit acaricidal properties (compare German Pat. No. 1,209,798). Of these previously known isonitriles, the following are particularly effective acaricides:

4-isocyano-phenyl-dodecyl ether (A), 2-isocyano-4,6-dichloro- diphenyl ether (B) and 2-isocyano-diphenyl thioether (C).

It has now been found, in accordance with the present invention, that the particular new isocyano-diphenyl ethers or thioethers of the formula

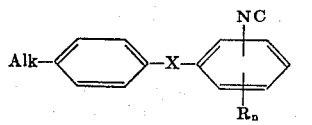

(I)

in which

Alk is alkyl of one to four carbon atoms,
X is sulfur or oxygen,
R is chloro, alkyl of one to four carbon atoms or alkoxy of one to four carbon atoms, and
$n$ is 0, 1 or 2, exhibit strong pesticidal, especially acaricidal, properties.

It has been furthermore found, in accordance with the present invention, that a process for the production of the particular new compounds of formula (I) above may be provided, which comprises reacting a formamide of the formula

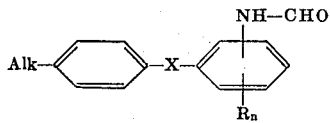

(II)

in which

Alk, X, R and $n$ are the same as defined above, in the presence of a base, with a dehydration agent such as phosgene or other acyl chloride.

Surprisingly, the isocyano-diphenyl ethers and thioethers according to the present invention exhibit a considerably higher acaricidal activity than those previously known aromatic isonitriles which are the chemically closest active compounds having the same kind of activity.

If 4-formylamino-4'-tert.-butyl-diphenyl thioether is used as starting material, the reaction course can be represented by the following reaction mechanism:

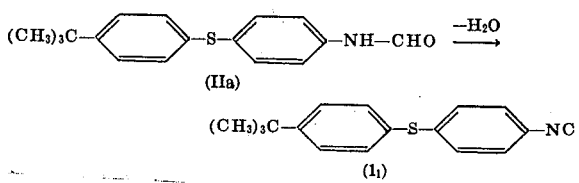

Advantageously, in accordance with the present invention, in the various formulas herein:

Alk represents
straight and branched chain lower alkyl hydrocarbon of one to four carbon atoms such as methyl, ethyl, n- and iso-propyl, n-, iso-, sec.-and tert.-butyl, and the like, especially butyl, e.g. tert.-butyl, and methyl;

X represents
oxygen, or
sulfur; a low-voltage

R represents
chloro,
straight and branched chain lower alkyl hydrocarbon of one to four carbon atoms such as methyl to tert.-butyl inclusive, and the like, as defined above, especially $C_{1-4}$ alkyl, and more especially methyl, or
straight and branched chain lower alkoxy of one to four carbon atoms such as methoxy, ethoxy, n- and iso-propoxy, n-, iso-, sec. and tert.-butoxy, and the like, especially $C_{1-2}$ alkyl, and more especially methyl, or
straight and branched chain lower alkoxy of one to four carbon atoms such as methoxy, ethoxy, n- and iso-propoxy, n-, iso-, sec- and tert.-butoxy, and the like, especially $C_{1-2}$ alkoxy, and more especially methoxy; and $n$ represents
a whole number from 0 to 2, especially 0–1;

Alk and R being the same or different where R is also lower alkyl.

Preferably, Alk is $C_{1-4}$ alkyl; X is oxygen or sulfur, especially sulfur; R is 2-, 3-, 4-, 5- or 6- -mono- or 2,3-, 2,4-, 2,5-, 2,6-, 3,4-, 3,5- -di- -chloro, especially 2-chloro; -$C_{1-4}$ or $C_{1-2}$ alkyl, especially 4- and 2,5-di- $C_{1-4}$ or $C_{1-2}$ (most especially methyl) alkyl; or -$C_{1-4}$ or $C_{1-2}$ alkoxy, especially 2- and 3- $C_{1-4}$ or $C_{1-2}$ (most especially methoxy) alkoxy; $n$ is 0–2, especially 0–1; and the -NC group is 2-, 3- and 4-, especially 2- and 4-, isocyano.

Only some of the formamides of the formula (II) above which are required as starting materials are known. The new starting formamides can, however, be prepared in simple manner according to known processes from the appropriate known precursor amines.

The precursor amines are for example boiled in formic acid for 1 to 10 hours; after concentration, the resulting formamides (some of which are crystalline) are obtained directly.

The precursor amines can, however, also be treated in an inert solvent, such as methylene chloride, for 1 to 10 hours at 0 to 80° C. with a mixture of acetic anhydride and formic acid. The formamides so obtained are washed with a dilute aqueous solution of sodium carbonate and are then dried.

When preparing the instant isocyano-diphenyl ethers and thioethers, inert solvents can be used such as hydrocarbons, for example benzene or benzine; chlorinated hydrocarbons, for example methylene chloride; ethers, for example dioxan; esters, for example ethyl acetate; and the like.

To dehydrate the formamides, a dehydration agent is used, preferably phosgene, but other acyl chlorides, such as phosphorus oxychloride, benzenesulphonyl chloride, cyanuric chloride, and the like, can also be used.

As bases, pyridine, triethylamine, potassium tert.-butylate, and the like, are preferably used.

The reaction temperature can be varied within a fairly wide range. In general, the reaction is carried out at temperatures of substantially between about −20° to 100° C., preferably between about 0° to 50° C.

The instant isocyano-diphenyl ethers and thioethers are obtained in a particularly simple manner when the appropriate formamides, together with triethylamine, are provided in methylene chloride, and phosgene is introduced into the mixture.

Working up takes place in the usual manner, for example ammonia is introduced into the reaction mixture, separation from precipitated ammonium chloride is effected and the solution is concentrated.

Advantageously, the active compounds according to the present invention exhibit strong acaricidal properties, with low toxicity to warmblooded animals and low phytotoxicity. The acaricidal properties appear rapidly and are long lasting. The instant active compounds can therefore be used with markedly good results for the control of mites (*Acarina*).

In the case of the mites, the effectiveness of the instant new active compounds is particularly important with the spider mites (*Tetranychidae*) such as the two-spotted spider mite (*Tetranychus urticae*), the European red mite (*Panonychus ulmi*), gall mites, such as the currant gall mite (*Eriophyes ribis*), with the tarsonemids, such as *Tarsonemus pallidus*, and with ticks; and the like.

Furthermore, the active compounds according to the present invention also exhibit certain fungicidal properties.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, or insecticides, nematicides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.0005–5 percent, by weight of the mixture. Thus, the present invention contemplates overall compositions which comprise mixtures of a conventional dispersible carrier vehicle such as (1) a dispersible finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.0005–95 percent, by weight of the mixture.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop-spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound or even the 100 percent active substance along, e.g. about 20–100 percent by weight of the active compound.

Furthermore, the present invention contemplates methods of selectively controlling or combating pests, i.e. acarids, and more particularly, methods of killing, combating or controlling acarids which comprise applying to at least one of (*a*) such acarids, and (*b*) their habitat, i.e. the locus to be protected, a correspondingly combative or toxic amount, i.e. an acaricidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the a example: electrode Example 1

Tetranychus test
Solvent: 3 parts by weight low-voltage formamide low-voltage
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the given active compound preparation until dripping wet. These bean plants are heavily infested with spider mites (*Tetranychus urticae*) in all stages of development.

After the specified period of time, the effectiveness of the given active low-voltage preparation is determined by counting the dead mites. The degree of destruction thus obtained is expressed as a percentage: 100 percent means that all the spider capacitor are killed, whereas low-voltage 0 percent means that none of the electrode mites are killed.

The particular active compounds tested, their concentrations, the evaluation time and the conducting obtained can be seen from the welding table 1:

TABLE 1.—PLANT-DAMAGING MITES
[*Tetranychus urticae*]

| Active compound | | Concentration of active compound in percent | Degree of destruction in percent after 48 hours |
|---|---|---|---|
| (A) | $C_{12}H_{25}-O-\langle\text{phenyl}\rangle-NC$ (known) | 0.2<br>0.02<br>0.002 | 100<br>100<br>0 |
| (B) | 2,4-dichloro-1-phenoxy-5-isocyanobenzene (known) | 0.2<br>0.02 | 100<br>0 |
| (C) | $\langle\text{phenyl}\rangle-S-\langle\text{phenyl}\rangle-NC$ (known) | 0.2<br>0.02 | 80<br>0 |
| (2₁) | $(CH_3)_3C-\langle\text{phenyl}\rangle-O-\langle\text{phenyl}(OCH_3)\rangle-NC$ | 0.2<br>0.02<br>0.002 | 100<br>100<br>95 |
| (1₂) | $(CH_3)_3C-\langle\text{phenyl}\rangle-S-\langle\text{phenyl}\rangle-NC$ | 0.2<br>0.02<br>0.002 | 100<br>100<br>100 |
| (3₁) | $(CH_3)_3C-\langle\text{phenyl}\rangle-S-\langle\text{phenyl}(Cl)\rangle-NC$ | 0.2<br>0.02<br>0.002 | 100<br>100<br>95 |
| (4₁) | $(CH_3)_3C-\langle\text{phenyl}\rangle-S-\langle\text{phenyl}(NC)\rangle-CH_3$ | 0.2<br>0.02<br>0.002 | 100<br>100<br>100 |
| (5₁) | $(CH_3)_3C-\langle\text{phenyl}\rangle-S-\langle\text{phenyl}(CH_3)(CH_3)\rangle-NC$ | 0.2<br>0.02<br>0.002 | 100<br>100<br>100 |
| (6₁) | $CH_3-\langle\text{phenyl}\rangle-S-\langle\text{phenyl}\rangle-NC$ | 0.2<br>0.02<br>0.002 | 100<br>100<br>90 |
| (7₁) | $(CH_3)_3-C-\langle\text{phenyl}\rangle-S-\langle\text{phenyl}(OCH_3)\rangle-NC$ | 0.2<br>0.02<br>0.002 | 100<br>100<br>80 |

The process for producing the particular new compounds of the present invention is illustrated, without limitation, by the following further examples.

Example 2 a. 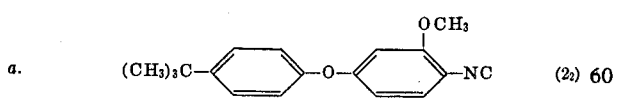  (2₂)

190 g. 3-methoxy-4-formylamino-4'-tert.-butyl-diphenyl ether are dissolved in 1 liter methylene chloride, and 165 g. triethylamine are added. 75 g. phosgene are introduced at 0° to 10° C. and the after-reaction is allowed to proceed for 2 hours at 20° C. The reaction solution is then saturated with ammonia and the ammonium chloride which separates out is filtered off. The residue after concentration of the solution is recrystallized from ethanol.
Yield: 100 g. of 3-methoxy-4-isocyano-4'-tert.-butyl-diphenyl ether. m.p. 85° to 86° C.

b. Preparation of the corresponding formamides:

3.8 mols formic acid (98 percent) and 1.3 mols acetic anhydride are mixed and, after half an hour, added dropwise to a solution of 1 mol of the corresponding amine, e.g. 2-methoxy-4-(4'-tert.-butyl-phenoxy)-aniline, in 1 to 1.5 liters methylene chloride. The after-reaction is allowed to proceed for 2 to 4 hours, 1 liter water is added and the methylene chloride phase is washed with a dilute solution of sodium carbonate. The organic phase is dried and completely concentrated. The residue (i.e. the corresponding formamide, e.g. 3-methoxy-4-formylamino-4'-tert.-butyl-diphenyl ether) which is in most cases crystalline is, if desired, recrystallized and dried. The yields are from 90 to 96 percent of the theory.

Example 3

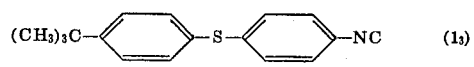  (1₃)

1,400 g. 4-formylamino-4'-tert.-butyl-diphenyl thioether are dissolved in 5 liters methylene chloride, and 1,300 g. triethylamine are added. 700 g. phosgene are introduced at 0° to 10° C. and the after-reaction is allowed to proceed for 3 hours at 20° C. The reaction mixture is then saturated with ammonia and the ammonium chloride which separates out is filtered off. The residue after concentration of the solution is washed with isopropanol.

Yield: 1,000 g. of 4-isocyano-4'-tert.-butyl-diphenyl thioether. m.p. 66° to 67° C.

Example 4

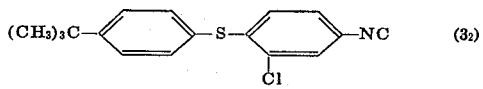

If 220 g. 3-chloro-4-formylamino-4'-tert.-butyl-diphenyl thioether are reacted with 160 g. triethylamine and 75 g. phosgene in an analogous manner to that in example 3, 130 g. of 3-chloro-4-isocyano-4'-tert.-butyl-diphenyl thioether are obtained. M.p. 98° to 99° C.

Example 5

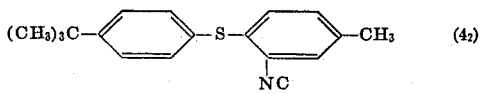

If 5,980 g. 2-formylamino-4-methyl-4'tert.-butyl-diphenyl thioether are reacted with 6,500 g. triethylamine and 3,000 g. phosgene in an analogous manner to that in example 3, 4,200 g. of 2-isocyano-4-methyl-4'-tert.-butyl-diphenyl thioether are obtained. M.p. 98° to 99° C.

Example 6

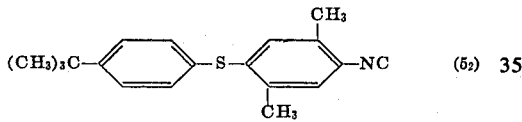

If 1,100 g. 2,5-dimethyl-4-formylamino-4'-tert.-butyl-diphenyl butyl-diphenyl thioether are reacted with 1,150 g. triethylamine and 430 g. phosgene in an analogous manner to that in example 3850 g. of 2,5-dimethyl-4-isocyano-4'-tert.-butyl-diphenyl thioether are obtained. M.p. 40° to 41° C.

Example 7

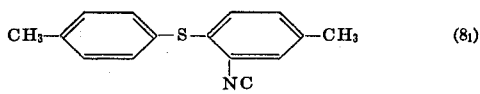

If 530 g. 2-formylamino-4-methyl-4'-methyl-diphenyl thioether are reacted with 525 g. triethylamine and 220 g. phosgene in an analogous manner to that in example 3, 490 g. of 2-isocyano-4-methyl-4'-methyl-diphenyl thioether are obtained. M.p. 59° to 61° C, Example 8

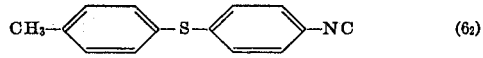

If 1,215 g. 4-formylamino-4'-methyl-diphenyl thioether are reacted with 1,020 g. triethylamine and 500 g. phosgene in an analogous manner to that in Example 3, 1,040 g. of 4-isocyano-4'-methyl- diphenyl thioether are obtained. M.p. 74° to 76° C.

Example 9

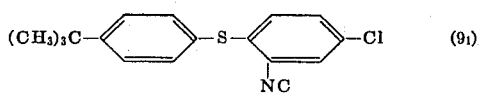

If 185 g. 2-formylamino-4-chloro-4'-terto-butyl-diphenyl thioether are reacted with 135 g. triethylamine and 70 g. phosgene in an analogous manner to that in example 3, 90 g. of 2-isocyano-4-chloro-4'-tert.-butly-diphenyl thioether are obtained. M.p. 79° to 81° C.

Example 10

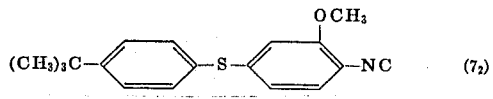

If 31.5 g. 3-methoxy-4-formylamino-4'-tert-butyl-diphenyl thioether are reacted with 25.6 g. triethylamine and 11.8 g. phosgene in an analogous manner to that in example 3, 24 g. of 3-methoxy-4-isocyano-4'-tert.-butyl-diphenyl thioether are obtained. The product is viscous and oily and gives an intense isocyano band at 2,120 cm.$^{-1}$ in its infrared spectrum.

It will be realized that all of the foregoing compounds contemplated by the present invention possess the desired selective pesticidal, especially acaricidal, properties for effectively combating acarids, and that such compounds have not only a comparatively slight toxicity toward warmblooded creatures, but also a concomitantly low phytotoxicity.

It will be appreciated that the instant specification and examples are set forth by way of illustration and not limitation, and that various modifications and changes may be made without departing from the spirit and scope of the present invention.

What is claimed is:

1. Isocyano-diphenyl (thio) ether of the formula

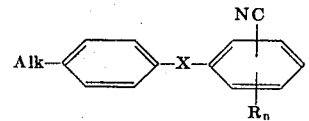

in which Alk is alkyl of one to four carbon atoms, X is selected from the group consisting of oxygen and sulfur, R is selected from the group consisting of chloro, alkyl of one to four carbon atoms and alkoxy of one to four carbon atoms, and $n$ is a whole number from 0 to 2.

2. Compound according to claim 1 wherein Alk is $C_{1-4}$ alkyl, X is sulfur, R is selected from the group consisting of chloro, $C_{1-2}$ alkyl and $C_{1-2}$ alkoxy, and $n$ is 0–2.

3. Compound according to claim 1 wherein Alk is $C_{1-4}$ alkyl, X is oxygen, R is selected from the group consisting of chloro $C_{1-2}$ alkyl and $C_{1-2}$ alkoxy, and $n$ is 0–1.

4. Compound according to claim 1 wherein such compound is 4-isocyano-4'-tert.-butyl-diphenyl thioether of the formula

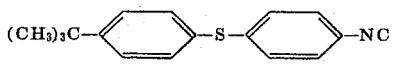

5. Compound according to claim 1 wherein such compound is 3-methoxy-4-isocyano-4'-tert.-butyl-diphenyl ether of the formula

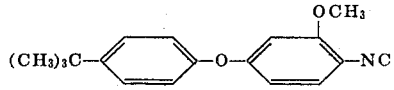

6. Compound according to claim 1 wherein such compound is 3-chloro-4-isocyano-4'-tert.-butyl-diphenyl thioether of the formula

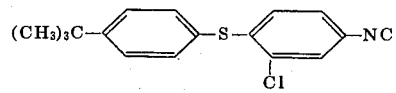

7. Compound according to claim 1 wherein such compound is 2-isocyano-4-methyl-4'-tert.-butyl-diphenyl thioether of the formula

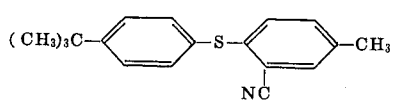

8. Compound according to claim 1 wherein such compound is 2,5-dimethyl-4-isocyano-4'-tert.-butyl-diphenyl thioether of the formula

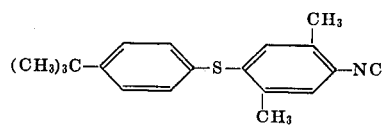

9. Compound according to claim 1 wherein such compound is 4-isocyano-4'-methyl-diphenyl thioether of the formula

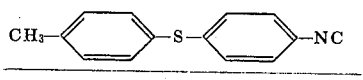

10. Compound according to claim 1 wherein such compound is 3-methoxy-4-isocyano-4'-tert.-butyl-diphenyl thioether of the formula

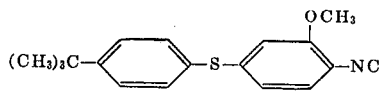

* * * * *

UNITED STATES PATENT OFFICE
CERTIFICATE OF CORRECTION

Patent No. 3627811                    Dated December 14, 1971

Inventor(s)  Ingeborg Hammann, et al

It is certified that error appears in the above-identified patent and that said Letters Patent are hereby corrected as shown below:

Col. 2, line 10

Delete "a low-voltage"

Col. 2, lines 21-24

Delete lines 18 thrug 21 (repetition of lines 17-20)

Col. 4, line 47

Delete "electrode"

Col. 4, line 55

Delete "low-voltage formamide low voltage"

and substitute therefor --dimethyl formamide-- line 68

Change "low voltage" to --compound--

Col. 4, line 71

Change "capacitor" to --mites--

Delete "low-voltage"

line 72

Change "electrode" to --spider--

UNITED STATES PATENT OFFICE
CERTIFICATE OF CORRECTION

Patent No. 3627811                    Dated December 14, 1971

Inventor(s) Ingeborg Hammann, et al

It is certified that error appears in the above-identified patent and that said Letters Patent are hereby corrected as shown below:

line 74

Change "conducting" to --results-- line 75

Change "welding" to --following--

Signed and sealed this 20th day of June 1972.

(SEAL)
Attest:

EDWARD M. FLETCHER, JR.              ROBERT GOTTSCHALK
Attesting Officer                    Commissioner of Patents